June 22, 1948.  S. W. BALDWIN  2,443,976
WINDSHIELD CLEANER
Filed Dec. 27, 1944
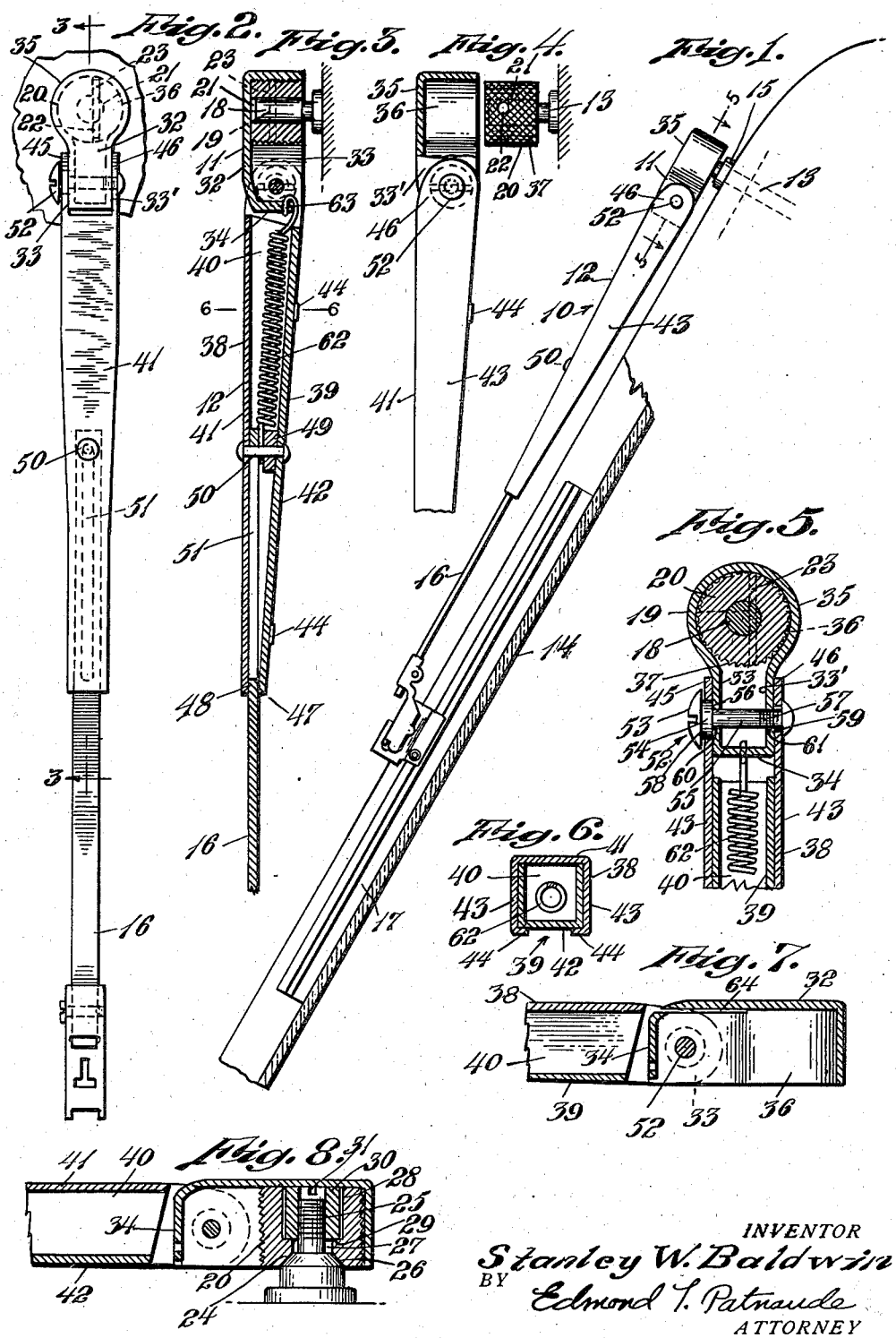
INVENTOR
*Stanley W. Baldwin*
BY *Edmond T. Patnaude*
ATTORNEY Patented June 22, 1948

2,443,976

UNITED STATES PATENT OFFICE 2,443,976

WINDSHIELD CLEANER

Stanley W. Baldwin, Cranston, R. I., assignor to Hackett Automotive Accessories Corporation, a corporation of Rhode Island Application December 27, 1944, Serial No. 569,980

9 Claims. (Cl. 15—250)

This invention relates to improvements in windshield cleaners, particularly to wiper carrying arms and means for attaching it to the actuating shaft of the cleaner.

In order that a particular wiper arm may be attached to any of several different structural endings of actuating shafts of windshield cleaners, a bushing usually termed an adapter is employed. The adapter is designed to embrace the end of the shaft and is secured thereto in an appropriate manner. This in some instances consists of extending a dowel pin through the walls of the adapter and through the shaft. In other instances when the shaft has a threaded ending a nut is employed to clamp adapter and shaft to each other.

Various means and devices have been proposed for detachably attaching the wiper arm to the adapter. These devices are usually confined within the walls of the wiper arm section and because of such location offer difficulties when attempting to manipulate the same by the novice or non-mechanically inclined person.

It is an object of this invention to provide means for detachably attaching the wiper arm to an adapter which will be at a location outwardly of the wiper arm so as to be readily accessible.

Another object of the invention is to provide means for detachably attaching the wiper arm to the adapter in adjustable position.

Another object of the invention is to provide means permanently attached to the wiper arm for detachably attaching the wiper arm to the adapter.

Another object of the invention is to provide a wiper arm in which resilient means for urging the wiper blade in contact with the windshield is concealed from view.

With these and other objects in view, the invention comprises certain novel features of construction as will be hereinafter more fully described and claimed, and illustrated in the accompanying drawings, in which Fig. 1 is a fragmentary sectional view of a windshield equipped with a cleaner embodying my invention;

Fig. 2 is a front view of the wiper carrying arm shown in Fig. 1;

Fig. 3 is a sectional view taken substantially along line 3—3 of Fig. 2;

Fig. 4 is a view of a fragmentary portion of the wiper carrying arm and actuating shaft spaced from each other;

Fig. 5 is a sectional view taken substantially along line 5—5 of Fig. 1;

Fig. 6 is a sectional view taken substantially along line 6—6 of Fig. 3;

Fig. 7 is a fragmentary sectional view of a modified form of wiper arm; and

Fig. 8 is a sectional view of the wiper arm showing it attached to a wiper arm supporting shaft provided with a threaded end portion.

Referring to the drawings for a more detailed description of the invention, the numeral 10 designates in general a wiper carrying arm or wiper arm. The wiper arm is formed in two sections 11 and 12 hingedly connected to each other. One of said sections is attached to a wiper arm supporting shaft 13 which generally protrudes outwardly from the vehicle at a location adjacent to the windshield 14 such as at 15. The other section mounts a bar 16 which is movable lengthwise of the section to vary the length of the wiper arm and carries at the lower end portion thereof a wiper blade 17. Resilient means acting upon and between the sections, is provided for yieldingly biasing the arm and wiper blade into engagement with the windshield. The hinge connection between the sections will permit relative movement of one section in a direction perpendicular to the windshield so as to raise the wiper blade from the window when desired.

The shaft 13 may have a straight ending portion 18 having an opening 19 extending laterally therethrough. An adapter 20 has an opening 21 of a size to nicely receive the end portion 18 of the shaft, and an opening 22 which intersects the opening 21. The adapter is positioned over the portion 18 with the opening 22 aligned with the opening 19 in the shaft. A dowel pin 23 is snugly received in the openings and firmly secures the adapter to the shaft in non-rotative relation therewith.

In other instances the end portion of the shaft may terminate in a tapered part 24 from which there extends a threaded extension 25, see Fig. 8. The adapter in this instance is formed with a complementary tapered recess 26 and a central opening 27 which opens into a cavity 28 extending inwardly from the opposite side of the adapter. The intersection of the opening 27 and bottom wall of the cavity 28 forms a shoulder 29. With the adapter in position on the taper part 24 the threaded extension 25 will extend into the cavity and threadedly receives a threaded element 30. This element 30 may be provided with a slot 31 for engagement by a screw driver so as to be rotated on the threaded portion 25 to move into engagement with the shoulder 29 and bind the adapter and shaft to each other. The element 30 is of a size when into engagement with the shoulder, to extend short of the outer edge of the cavity 28.

The section 11 is of a hollow formation opening towards the wiper arm supporting shaft 13. It has a front wall 32, side walls 33, 33' and end wall 34. The side walls extend towards each other into circular formation providing a head portion 35 having a cavity or recess 36 in which is received the adapter 20. The side walls 33, 33' are resilient and may be deformed inwardly towards each other sufficiently to draw the walls of the recess 36 into tight engagement with adapter to firmly bind the same in the recess. The surface 37 of the adapter may be roughened such as by knurling to provide a better purchase between the adapter and walls of the cavity.

The arm section 12 is of a box like formation, comprising two channel members 38, 39 opening towards each other and snugly interfitting one within the other so as to provide a chamber 40 enclosed by a front wall 41, bottom wall 42 and side walls 43 of a double thickness. This assembly is held together by tabs 44 which extend from the side walls of the outer channel member 38 and are turned inwardly into engagement with the bottom wall 42. The side walls of the member 38 extend beyond the front wall 41 forming ears 45 and 46 between which is received the arm section 11. The front wall 41 and bottom wall 42 converge towards each other as at 47 and provide a bearing opening 48 at the end of the section for slidably supporting the bar 16. The bar is supported within the chamber between a plate 49 and the front wall 41. The plate is secured in place by a rivet pin 50 extending through the front wall, plate and bottom wall and with its ends upset against the front and bottom walls.

The bar 16 has a slot 51 through which the pin 50 passes. The end of the slot 51 engages the pin in either extreme positions of adjustment and limits the extent of movement of the bar 16. There is a sufficient snug engagement between the bar and its bearing supports so as to be retained in any adjusted position. The arm may be increased or decresed in length by a relative movement of arm and bar in the proper direction.

The sections 11 and 12 are hingedly secured to each other and the side walls 33, 33' are deflected towards each other by a member 52. This member has an enlarged slotted head 53, a body 54 reduced as at 55 forming a shoulder 56 and a shank 57 which is threaded at the end portion thereof. The ears 45 and 46 of section 12 are provided with aligned openings 58, 59 respectively. These openings are aligned with an opening 60 in the wall 33 and a threaded opening 61 in the wall 33' of section 11. The member 52 extends through all of these openings with the shoulder 56 engaging the wall about the opening 60 and the shank 57 threadingly engaging the opening 61. The end portion of the shank is upset against ear 46, to permanently attach member 52 to the wiper arm.

The section 12 is free to pivot on the body 54 and shank 57. Rotating the member 52 in a direction to advance the shank 57 through opening 61 will, through shoulder 56 acting against the wall 33, pull the walls 33 and 33' towards each other and draw the walls of the recess 36 into tight engagement with the adapter. Rotating member 52 in the opposite direction will permit the walls 33, 33' which are of a resilient material. to spring apart to permit detaching of the wiper arm from the adapter. A sufficient clearance is provided between the head 53 and the ear 45 to permit turning of member 52 to an extent necessary to move the walls 33, 33' towards each other, to firmly bind the adapter and wiper arm to each other. Should it become necessary to adjust the position of the arm on the adapter, the member 52 is rotated to loosen the section 11 from the adapter. The arm may then be rotated to proper position on the adapter.

The wiper arm and wiper blade carried thereby is resiliently bias into engagement with the windshield by a pull spring 62 anchored at one end to the wall 34 as at 63 and its other end is anchored to the rivet pin 50.

In some instances I may separate the side walls 33, 33' for a distance along the edges of the front wall 32 such as by providing a slot 64, one on each side wall at the junction of the front wall 32 therewith. This will provide greater flexibility in the walls 33 and 33'.

It may be desirable in some windshield cleaner installation to attach the wiper arm directly onto the end portion of the actuating shaft. In such a situation the recess 36 may be of a dimension to receive the shaft proper.

I claim:

1. In a windshield cleaner, a wiper arm supporting shaft, an adapter secured to said shaft, a wiper arm having a pair of sections, one of said sections having a recess for receiving said adapter, means for moving the walls of the recess into firm engagement with said adapter, said means hingedly connecting said sections to each other and resilient means secured to said sections for yieldingly biasing one of said sections for movement about said means hingedly connecting said sections.

2. In a windshield cleaner, a wiper arm supporting shaft, an adapter secured to said shaft, a wiper arm having a pair of sections, one of said sections having walls forming a recess for receiving said adapter, means extending through said walls for moving the same into firm engagement with said adapter, said means hingedly connecting said sections to each other and resilient means secured to said sections for yieldingly biasing one of said sections for movement about said means hingedly connecting said sections.

3. In a windshield cleaner, a wiper arm supporting shaft, an adapter secured to said shaft, a wiper arm having a pair of sections, one of said sections having walls forming a recess for receiving said adapter, a threaded member having a shoulder engaging one of said walls and threadedly received in the other of said walls for moving said walls into firm engagement with said adapter, said member hingedly connecting said sections to each other and resilient means for yieldingly biasing said section for relative movement about said member.

4. In a windshield cleaner, a wiper arm supporting shaft, an adapter secured to said shaft, a wiper arm having a pair of sections, one of said sections having front and side walls forming a recess for receiving said adapter, a threaded member extending through said side walls and having a shoulder engaging one of said side walls and threadedly received in the other side wall for moving said walls into firm engagement with said adapter, said member hingedly connecting said sections to each other and resilient means for yieldingly biasing said section for relative movement about said member.

5. In a windshield cleaner, a wiper arm supporting shaft, an adapter secured to said shaft, a wiper arm having a pair of sections, one of said sections having walls forming a recess for receiving said adapter, the other section having spaced ears between which is received the said one of said sections, means extending through said ears and said walls for hingedly connecting said sections and for moving said walls into firm engagement with said adapter for detachably attaching said wiper arm to said adapter and resilient means for yieldingly biasing said section for relative movement about said member.

6. In a windshield cleaner, a wiper arm supporting shaft, an adapter secured to said shaft, a wiper arm having a pair of sections, one of said sections having walls forming a recess for receiving said adapter, the other section having spaced ears between which is received the other section, a threaded member extending through said ears and walls for hingedly connecting said sections said member having a body portion extending through one of said ears and a reduced portion providing a shoulder thereon engaging one of said walls with the reduced portion extending through said ears and threadedly received in the other of said walls for moving said walls into firm engagement with said adapter for detachably attaching said arm to said adapter.

7. In a windshield cleaner, a wiper arm supporting shaft, an adapter secured to said shaft, a wiper arm having a pair of sections, one of said sections having walls forming a recess for receiving said adapter, the other section having spaced ears between which is received the other section, a threaded member extending through said ears and walls for hingedly connecting said sections, said member having a body extending through one of said ears and a reduced portion providing a shoulder thereon engaging one of said walls with the reduced portion extending through said ears and threadedly received in the other of said walls for moving the same into firm engagement with said adapter, said member having the threaded end thereof upsetted to secure the same to said arm.

8. In a windshield cleaner, a wiper arm supporting shaft, a wiper arm attached to said shaft and having a pair of sections hingedly connected to each other, one of said sections having an end wall at a location adjacent to the other section, the other section having front, bottom and side walls forming a chamber therein, a spring in said chamber for urging relative movement between said sections, said spring being anchored at one end directly to said end wall and the other end anchored in said chamber.

9. A wiper arm comprising a pair of sections, one of said sections having walls forming a recess therebetween for attachment to the actuating shaft of a windshield cleaner, the other section having spaced ears between which the said walls are received, a threaded member extending through said ears and walls for hingedly connecting said sections, said member having a reduced portion providing a shoulder thereon engaging one of said walls with the reduced portion extending through said ears and threadedly received in the other of said walls for moving said walls towards each other.

STANLEY W. BALDWIN.

REFERENCES CITED

The following references are of record in the file of this patent:

UNITED STATES PATENTS

| Number | Name | Date |
| --- | --- | --- |
| 1,888,665 | Herlbauer et al | Nov. 22, 1932 |
| 2,156,505 | Marcolivio | May 2, 1939 |
| 2,229,718 | Bramming | Jan. 28, 1941 |
| 2,245,244 | Zaiger | June 10, 1941 |
| 2,269,623 | Ehrlich | Jan. 13, 1942 |
| 2,286,035 | Horton et al. | June 9, 1942 |
| 1,730,342 | Anderson | Oct. 31, 1929 |